US009071694B2

(12) United States Patent
Klinghult (10) Patent No.: US 9,071,694 B2
(45) Date of Patent: Jun. 30, 2015

(54) PERSONAL HANDS-FREE ACCESSORY FOR MOBILE DEVICE

(75) Inventor: Gunnar Klinghult, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 405 days.

(21) Appl. No.: 13/462,166

(22) Filed: May 2, 2012

(65) Prior Publication Data

US 2013/0295850 A1 Nov. 7, 2013

(51) Int. Cl.
*H04B 5/00* (2006.01)
*H04M 1/60* (2006.01)
*H04M 1/725* (2006.01)

(52) U.S. Cl.
CPC ........ *H04M 1/6058* (2013.01); *H04M 1/72591* (2013.01)

(58) Field of Classification Search
CPC ............................ H04M 1/6066; H04M 1/6041
USPC ..................................... 455/41.1, 41.3, 569.1
See application file for complete search history.

(56) References Cited

U.S. PATENT DOCUMENTS

| | | | |
|---|---|---|---|
| 6,615,059 B1* | 9/2003 | Pehrsson et al. ........... 455/569.1 |
| 7,634,098 B2* | 12/2009 | Townsend et al. ............ 381/321 |
| 7,957,771 B2* | 6/2011 | Frerking et al. ........... 455/569.1 |
| 2003/0050011 A1* | 3/2003 | Palermo et al. ................. 455/41 |
| 2004/0209658 A1* | 10/2004 | Liu et al. .................... 455/575.2 |
| 2005/0164636 A1* | 7/2005 | Palermo et al. ............... 455/41.2 |
| 2007/0036373 A1* | 2/2007 | Townsend et al. ............. 381/312 |
| 2008/0093447 A1* | 4/2008 | Johnson et al. ................ 235/383 |
| 2008/0299904 A1* | 12/2008 | Yi et al. ........................ 455/41.1 |
| 2009/0023479 A1* | 1/2009 | Hulvey ...................... 455/569.1 |
| 2010/0136905 A1* | 6/2010 | Kristiansen .................. 455/41.1 |
| 2010/0145134 A1* | 6/2010 | Madsen .......................... 600/23 |
| 2011/0136547 A1* | 6/2011 | Espersen et al. ........... 455/569.1 |
| 2012/0121095 A1* | 5/2012 | Popovski et al. ............ 381/23.1 |

OTHER PUBLICATIONS http://en.wikipedia.org/wiki/Hearing_aid#Telecoil.
http://www.audiology.org/resources/consumer/Documents/20101021_Telecoil_factSheet.pdf.

* cited by examiner

*Primary Examiner* — April G Gonzales
(74) *Attorney, Agent, or Firm* — Snyder, Clark, Lesch & Chung, LLP (57) ABSTRACT

A hands-free accessory for a mobile device may include a microphone element, and a telecoil coupled with the microphone element in parallel. The microphone element and the telecoil are coupled with an output terminal of the hands-free device. The hands-free accessory may further include a capacitor coupled with the telecoil in series. The hands-free accessory may further include an ear speaker. The hands-free accessory may further include a first switch between the microphone element and the telecoil. Alternatively, the mobile device may include a second switch configured to control operation of the microphone element. When the first switch or the second switch is turned off/closed, the microphone element is not operated, and a signal corresponding to an electric current induced in the telecoil is input/transmitted to the mobile device.

20 Claims, 7 Drawing Sheets

PERSONAL HANDS-FREE ACCESSORY FOR MOBILE DEVICE

TECHNICAL FIELD

Embodiments disclosed relate generally to hands-free accessories for mobile devices and mobile devices adaptable for hands-free accessories, and more particularly, to hands-free accessories for use in both telecommunication and telecoil systems.

BACKGROUND

Telecoil systems are used in public buildings such as museums, churches, train stations, and lecture halls, commercial buildings, offices, residential houses, and apartments to provide audio services to allow users to hear the audio sound provided by the telecoil systems without letting the users hear unwanted amplified environmental noises. However, to provide audio services of the telecoil system to the public, the public buildings or commercial buildings need to provide telecoil devices to people who want to exploit the telecoil systems.

SUMMARY

In one aspect of an embodiment, a hands-free accessory for a mobile device may include a microphone element, and a telecoil coupled with the microphone element in parallel. The microphone element and the telecoil may be coupled with an output terminal of the hands-free device. The output terminal of the hands-free accessory may be configured to electrically or wirelessly couple with an input terminal of the mobile device.

In one aspect, the hands-free accessory may include an ear speaker coupled with an input terminal of the hands-free accessory. The input terminal of the hands-free accessory may be configured to electrically or wirelessly couple with an output terminal of the mobile device.

In one aspect, the hands-free accessory may include a first switch coupled between the microphone element and the telecoil. The first switch may be automatically turned on or closed when the telecommunication signal is input or transmitted to the hands-free accessory from the mobile device.

In one aspect, the microphone element may include a capacitor element, and a Field Effect Transistor (FET). A first end of the capacitor element may be coupled with a source terminal of the FET. A second end of the capacitor element may be coupled with a gate terminal of the FET. A first end of the telecoil may be coupled with the source terminal. A second end of the telecoil may be coupled with a drain terminal of the FET.

In one aspect, the hands-free accessory may include a capacitor coupled with the telecoil in series, or a second switch coupled with the telecoil in series. A first end of the capacitor or a first end of the second switch may be coupled with a second end of the telecoil. A second end of the capacitor or a second end of the second switch may be coupled with the output terminal of the hands-free accessory.

In one aspect, the microphone element may include a capacitor element and a FET. A first end of the capacitor element may be coupled with a source terminal of the FET. A second end of the capacitor element may be coupled with a gate terminal of the FET. A first end of the telecoil may be coupled with the source terminal. The second end of the capacitor or the second end of the second switch may be coupled with a drain terminal of the FET.

In one aspect, inductance of the telecoil may be set according to a predetermined SNR of the telecoil.

In one aspect, the hands-free accessory may include a housing. The microphone element and the telecoil may be in the housing.

In one aspect, the hands-free accessory may include a shield configured to reduce electric interference between the telecoil and the microphone element.

In one aspect, a mobile device may include an input terminal configured to couple with an output terminal of a hands-free accessory including a microphone element and a telecoil coupled with the microphone element in parallel, a bias voltage circuit configured to supply a bias voltage to the microphone element, the bias voltage circuit coupled with the input terminal of the mobile device, and a processor configured to process a signal input or transmitted to the hands-free accessory from the input terminal of the mobile device. The microphone element may include a FET, and the bias voltage is set to operate the FET in the microphone element.

In one aspect, the mobile device may include a resistor between the bias voltage circuit and the input terminal of the mobile device.

In one aspect, the mobile device may include a first operational amplifier having a first inverting terminal and a first non-inverting terminal, and an A/D converter. The first inverting terminal may be coupled with a ground. The first non-inverting terminal may be coupled with the input terminal of the mobile device. An input port of the A/D converter may be coupled with a first output terminal of the first operational amplifier. An output port of the A/D converter may be coupled with an input port of the processor. The processor may be further configured to control turning on/off or closing/opening of a first switch between the microphone element and the telecoil.

In one aspect, the mobile device may include a third switch between the bias voltage circuit and a point of coupling the bias voltage circuit and the input terminal of the mobile device. The processor may be further configured to control turning on/off or closing/opening of the third switch.

In one aspect, the mobile device may include a D/A converter and a second operational amplifier having a second inverting terminal, a second non-inverting terminal, and a second output terminal. An input port of the D/A converter may be coupled with an output port of the processor. The second inverting terminal may be coupled with a ground. The second non-inverting terminal may be coupled with an output port of the D/A converter. The second output terminal may be coupled with an output terminal of the mobile device.

BRIEF DESCRIPTION OF THE DRAWINGS

The accompanying drawings, which are incorporated in and constitute a part of this specification, illustrate one or more embodiments described herein and, together with the description, explain the embodiments.

DETAILED DESCRIPTION

The following detailed description refers to the accompanying drawings. The same reference numbers in different drawings identify the same or similar elements.

Figure 1:
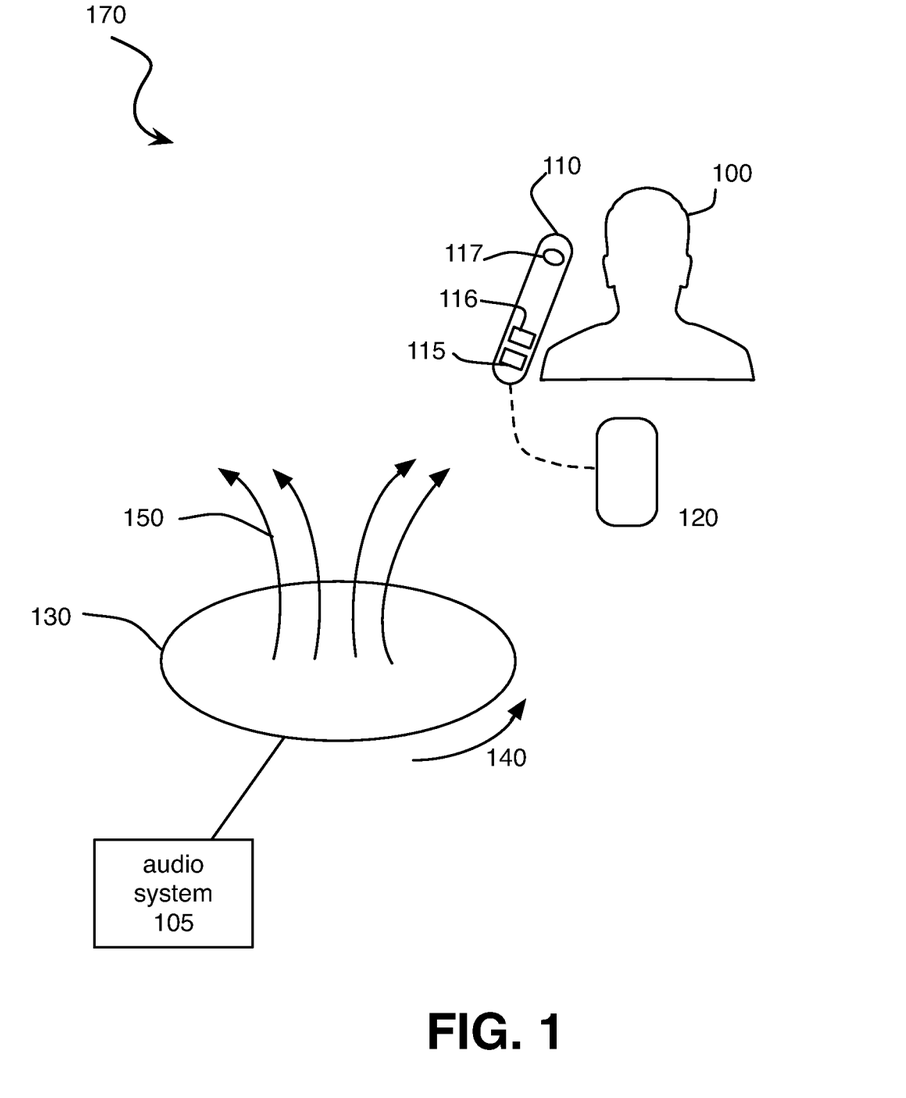
FIG. 1 is a diagram of an exemplary environment in which embodiments disclosed herein may be implemented.

FIG. 1 is a diagram of an exemplary environment in which embodiments disclosed herein may be implemented. Referring to FIG. 1, an environment 170 may include a user 100 who carries a mobile device 120 associated with a hands-free accessory 110, a wire loop 130, and an audio system 105 electrically coupled with the wire loop 130.

The mobile device 120 may be cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, a pager, an Internet/Intranet access, a Web browser, an organizer, a calendar and/or a global positioning system (GPS) receiver; and a laptop and/or palmtop receiver or other appliance that includes a radiotelephone transceiver. The mobile device 120 may be a personal computer (PC), a laptop computer, a tablet computer, a netbook, a media playing device (e.g., an MPEG audio layer 3 (MP3) player, a video game playing device, etc.), a GPS device, etc.

The hands-free accessory may 110 be a headset/earset configured to be electrically or wirelessly coupled with the mobile device 120. The hands-free accessory 110 may include a microphone element 115 and a telecoil 116. The microphone element 115 may be configured to convert acoustic waves to electrical signals. The microphone element 115 may be a condenser microphone, an electret condenser microphone, a fiber optic microphone, a MEMS microphone, or any kind of microphone. The telecoil 116 may include a core and a wire coil wrapped around the core. The core of the telecoil 116 may be made of metal.

The audio system 105 may be configured to provide electric signals to be converted to sounds. The sounds provided by an audio system 105 may include music, voice messages, or both. The audio system 105 may be coupled with the wire loop 130 installed in/around a building, a house, or a room to provide the sounds to a user associated with a telecoil. The building may be a museum, a theater, a church, a train station, a lecture hall, or any other kind of building for public use, an office building, a shop, or any other kind of building for commercial use. Alternatively, the wire loop 130 may be installed in an open space. The audio system 105 may provide to the wire loop 130 an alternating electric current 140 corresponding to the sounds.

Magnetic field 150 may be generated when the electric current 140 flows through the wire loop 130. When the magnetic field 150 is altered according to a change in the electric current 140, the magnetic field in the telecoil 116 may be altered, and an electric current may be induced in the telecoil 116. A voltage generated by the induced electric current in the telecoil 116 may be input to the mobile device 120, and amplified at the mobile device 120. Alternatively, the voltage generated by the induced electric current in the telecoil 116 may be amplified at the hands-free accessory 110, and the amplified voltage may be input to the mobile device 120. An electric signal may be generated by the amplified voltage, and processed at the mobile device 120.

The hands-free accessory 110 may include an ear speaker 117. The ear speaker 117 may be configured to convert electric signals input or transmitted from the mobile device 120 to sounds. The electric signal processed at the mobile device 120 may be input or transmitted to the hands-free accessory 110, and converted to sounds at the ear speaker 117. A user 100 may hear the sounds converted at the ear speaker 117 of the hands-free accessory 110.

Figure 2A:
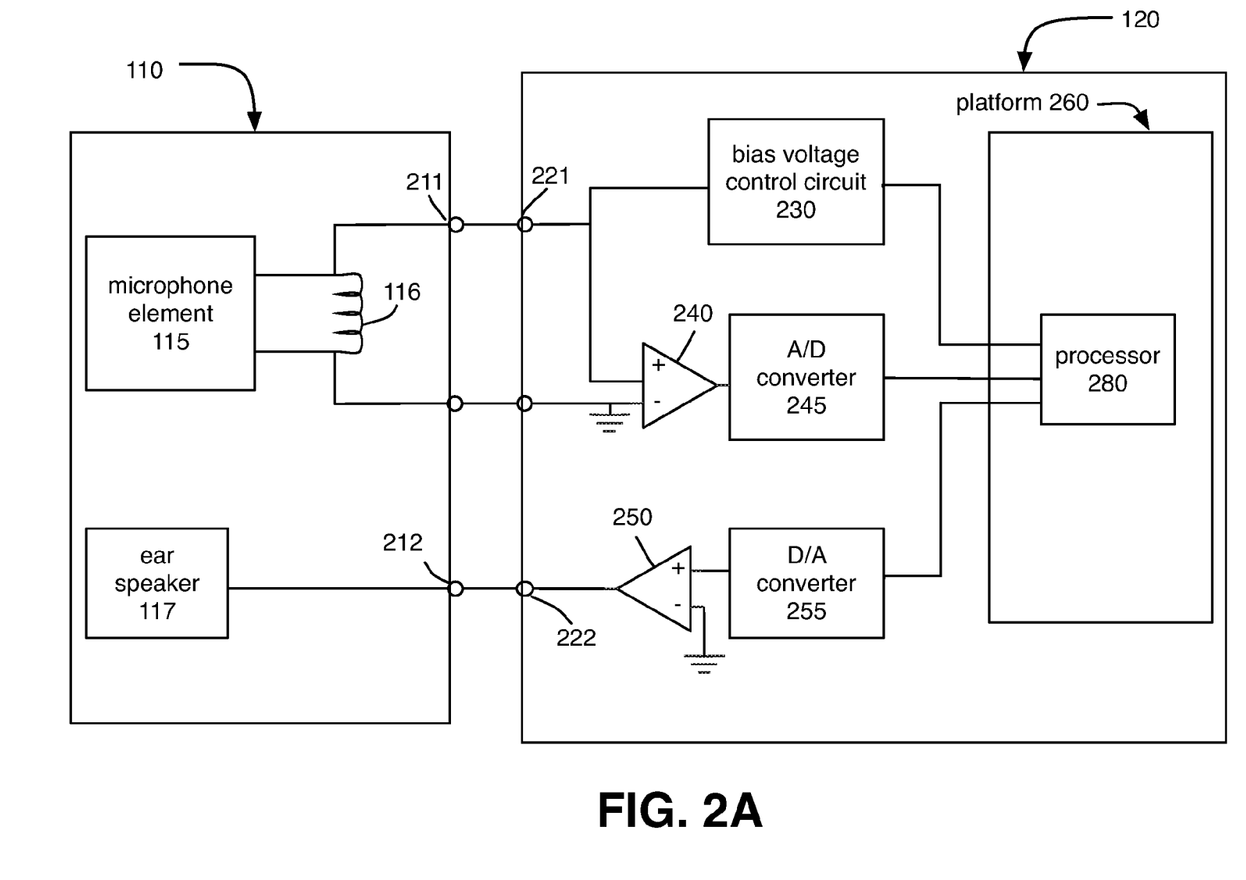
FIG. 2A is a block diagram of an exemplary hands-free accessory and an exemplary mobile device of FIG. 1.

FIG. 2A is a block diagram of an exemplary hands-free accessory 110 and an exemplary mobile device 120 of FIG. 1. An output terminal 211 of the hands-free accessory 110 may be configured to electrically couple with an input terminal 221 of the mobile device 120. An input terminal 212 of the hands-free accessory 110 may be configured to electrically couple with an output terminal 222 of the mobile device 120. The hand-free accessory 110 may include a microphone element 115 and the telecoil 116. The telecoil 116 may be coupled with the microphone element 115 in parallel. The microphone element 115 may also be coupled with the output terminal 211 of the hands-free device 110. One end of the telecoil 116 may be coupled with the output terminal 211 of the hands-free device 110. Inductance of the telecoil 116 may be based on the number of telecoil 116 and may be selected according to a predetermined signal-to-noise ratio (SNR). The ear speaker 117 in the hands-free accessory 110 may be coupled with the input terminal 212 of the hands-free accessory 110. The mobile device 120 may include a platform 260 including a processor 280. The mobile device 120 may also include a bias voltage circuit 230 configured to supply a bias voltage to the microphone element 115 in the hands-free accessory 110 to operate the microphone element 115. The bias voltage circuit 230 may be coupled with the input terminal 221 of the mobile device 120.

Figure 2B:
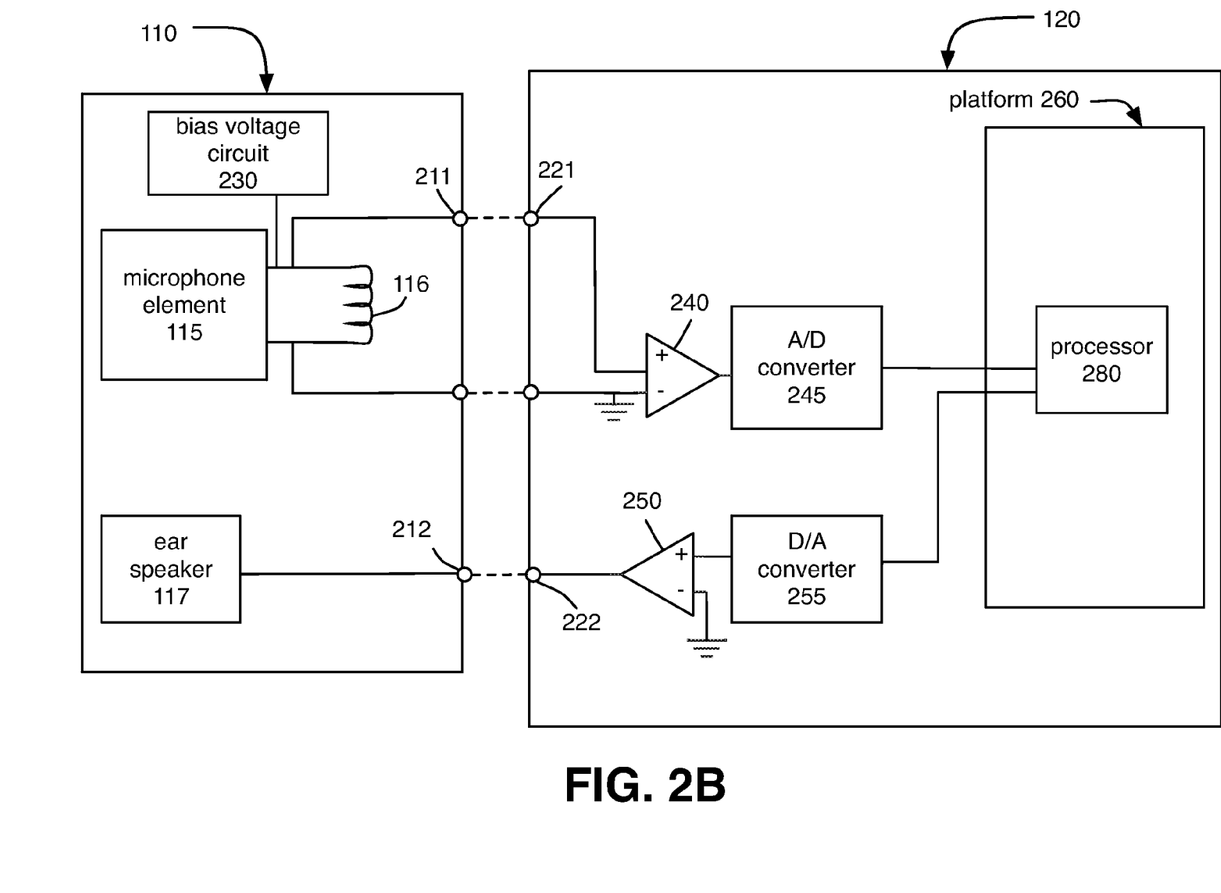
FIG. 2B is a block diagram of another exemplary hands-free accessory and an exemplary mobile device of FIG. 1.

FIG. 2B is a block diagram of another exemplary hands-free accessory 110 and an exemplary mobile device 120 of FIG. 1. The output terminal 211 of the hands-free accessory 110 may be configured to wirelessly couple with the input terminal 221 of the mobile device 120. The input terminal 212 of the hands-free accessory 110 may be configured to wirelessly couple with the output terminal 222 of the mobile device 120. The hand-free accessory 110 may include a microphone element 115 and the telecoil 116. The telecoil 116 may be coupled with the microphone element 115 in parallel. The microphone element 115 may also be coupled with the output terminal 211 of the hands-free device 110. One end of the telecoil 116 may be coupled with the output terminal 211 of the hands-free device 110. Inductance of the telecoil 116 may be set according to a predetermined SNR. The ear speaker 117 in the hands-free accessory 110 may be coupled with the input terminal 212 of the hands-free accessory 110. The hands-free accessory 110 may include the bias voltage circuit 230 configured to supply the bias voltage to the microphone element 115 in the hands-free accessory 110 to operate the microphone element 115. The mobile device 120 may include a platform 260 including the processor 280.

Figure 3A:
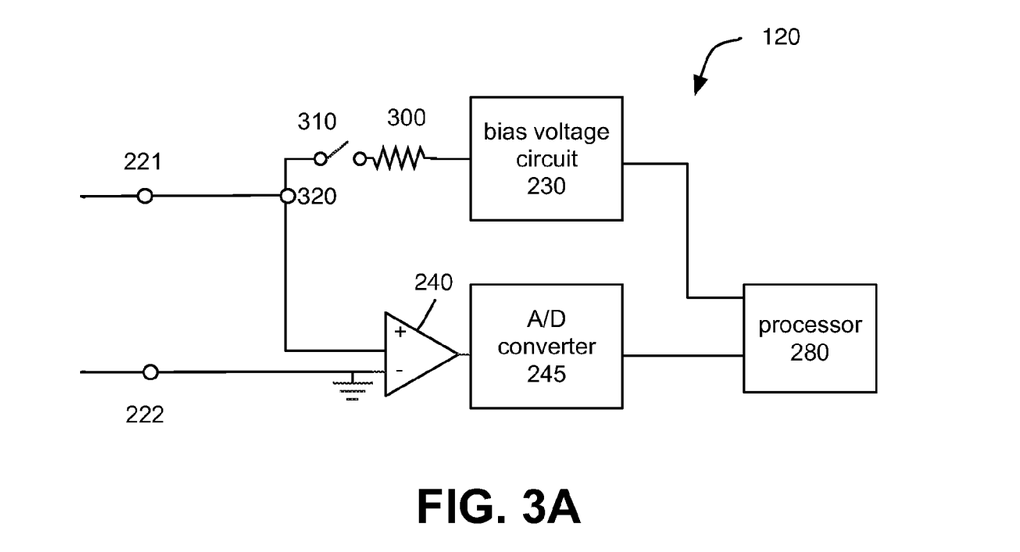
FIG. 3A is a schematic diagram of another exemplary circuit in the mobile device of FIG. 1.
Figure 3B:
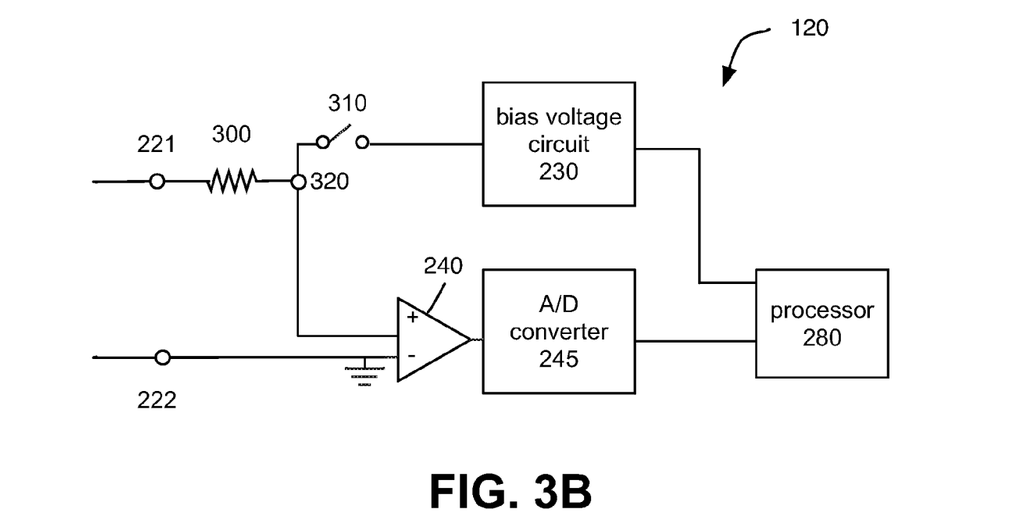
FIG. 3B is a schematic diagram of another exemplary circuit in the mobile device of FIG. 1.

FIG. 3A is a schematic diagram of another exemplary circuit in the mobile device of FIG. 1. FIG. 3B is a schematic diagram of another exemplary circuit in the mobile device 120 of FIG. 1. As illustrated in FIGS. 3A and 3B, the mobile device 120 may include a third switch 310 between the bias voltage circuit 230 and a node 320. A resistor may be located at any point between the bias voltage circuit 230 and the input terminal 221 of the mobile device 120. For example, as illustrated in FIG. 3A, a resistor 300 may be located between the bias voltage circuit 230 and a node 320. Alternatively, the resistor 300 may be located between the node 320 and the input terminal 221 of the mobile device 120. Supply of the bias voltage to the microphone element 115 may be controlled by turning on/off or closing/opening the third switch 310. The microphone element 115 may not be operated when the third switch 310 is turned off or opened. The third switch 310 may be turned off or opened to allow the user 100 to hear the sound provided by the audio system 105 without amplifying the ambient sounds and/or environmental noises. When the mobile device receives a telecommunication signal, the third switch 310 may be turned on or closed manually or automatically. For example, the processor 280 may be configured to control turning on/off or closing/opening of the third switch 310 when the mobile device 120 receives a telecommunication signal.

Figure 4A:
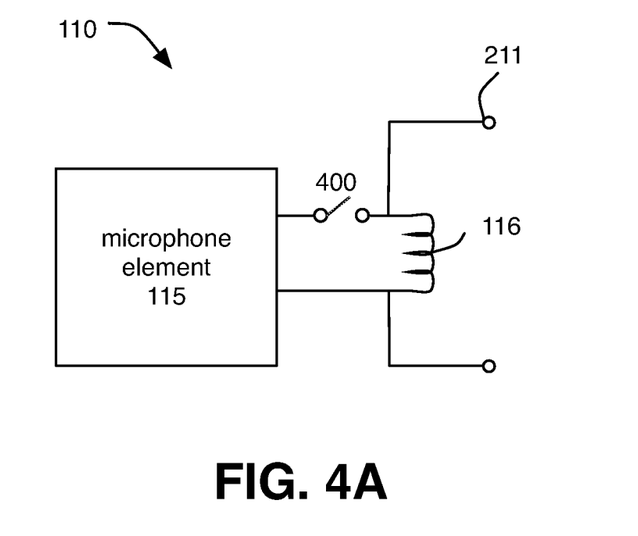
FIG. 4A is a schematic diagram of an exemplary circuit in the hands-free accessory of FIG. 1.
Figure 4B:
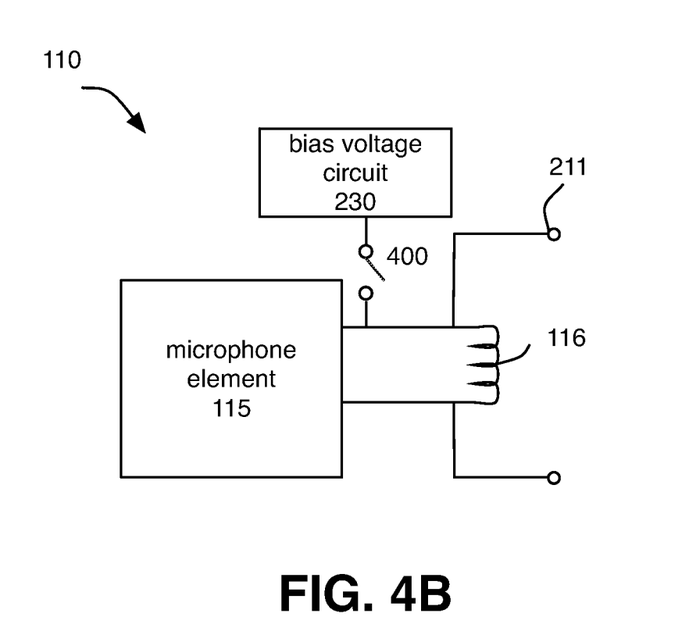
FIG. 4B is a schematic diagram of another exemplary circuit in the hands-free accessory of FIG. 1.

Alternatively, as illustrated in FIG. 4A, the hands-free accessory 110 may include a first switch 400 located between the output terminal 211 of the hands-free accessory 110 and the microphone element 115. Alternatively, as illustrated in FIG. 4B, the hands-free accessory 110 may include a first switch 400 located between the bias voltage circuit 230 and the microphone element 115. Turning on/off or closing/opening the first switch 400 may control supply of the bias voltage to the microphone element 115. The microphone element 115 may be operated when the first switch 400 is turned on or closed, as the bias voltage is supplied to the microphone element 115. The microphone element 115 may not be operated when the first switch 400 is turned off or opened, as the bias voltage is not supplied to the microphone element 115. When the third switch 310 is turned on or closed, the microphone element 115 may convert the user's voice, ambient sounds, and/or environmental noises to electric signals, and the electric signals may be input/transmitted to the mobile device 120. The input/transmitted signals may be processed by the processor 280. When the third switch 310 is turned off or opened, the induced electric current may be generated in the telecoil 116, while the microphone element 115 may not amplify the signals converted from the ambient sounds and/or environmental noises. Accordingly, the third switch 310 may be turned off or opened to allow the user 100 to hear the sound provided by the audio system 105 without amplifying the ambient sounds and/or environmental noises. When the mobile device 120 receives a telecommunication signal, the first switch 400 may be turned on or closed manually or automatically. For example, the processor 280 may be configured to control turning on/off or closing/opening of the first switch 400 when the mobile device 120 receives a telecommunication signal.

Referring back to FIGS. 2A and 2B, the mobile device 120 may include a first operational amplifier 240 having a first inverting terminal and a first non-inverting terminal. The first inverting terminal of the first operational amplifier 240 may be coupled with a ground. The first non-inverting terminal of the first operational amplifier 240 may be coupled with the input terminal 221 of the mobile device 120. The mobile device 120 may also include an analog/digital (A/D) converter 245. An input port of the A/D converter 245 may be coupled with a first output terminal of the first operational amplifier 240. A signal may be input/transmitted from the output terminal 211 of the hands-free accessory 110 to the input terminal 221 of the mobile device 120. The input/transmitted signal may be amplified by the first operational amplifier 240. The A/D converter 245 may convert the amplified signal to a digital signal. The digital signal may be input to the processor 280. The processor 280 may process the input digital signal.

The mobile device 120 may include a second operational amplifier 250 having a second inverting terminal and a second non-inverting terminal. The mobile device 120 may also include a digital/analog (D/A) converter 255. The second inverting terminal of the second operational amplifier 250 may be coupled with the ground. The second non-inverting terminal of the second operational amplifier 250 may be coupled with an output port of the D/A converter 255. A second output terminal of the second operational amplifier 250 may be coupled with the output terminal 222 of the mobile device 120. The digital signal processed by the processor 280 may be input to the D/A converter 255. The D/A converter 255 may convert the processed digital signal to an analog signal. The second operational amplifier 250 may amplify the analog signal. The amplified analog signal may be input/transmitted from the output terminal 222 of the mobile device 120 to the input terminal 212 of the hands-free accessory 110.

The mobile device 120 may provide a platform 260 for the user 100 to send and receive communications (e.g., telephone calls, electronic mail, text messages, multi-media messages, short message service (SMS) messages, etc.), play music, search the Internet, or perform various other functions.

Figure 5:
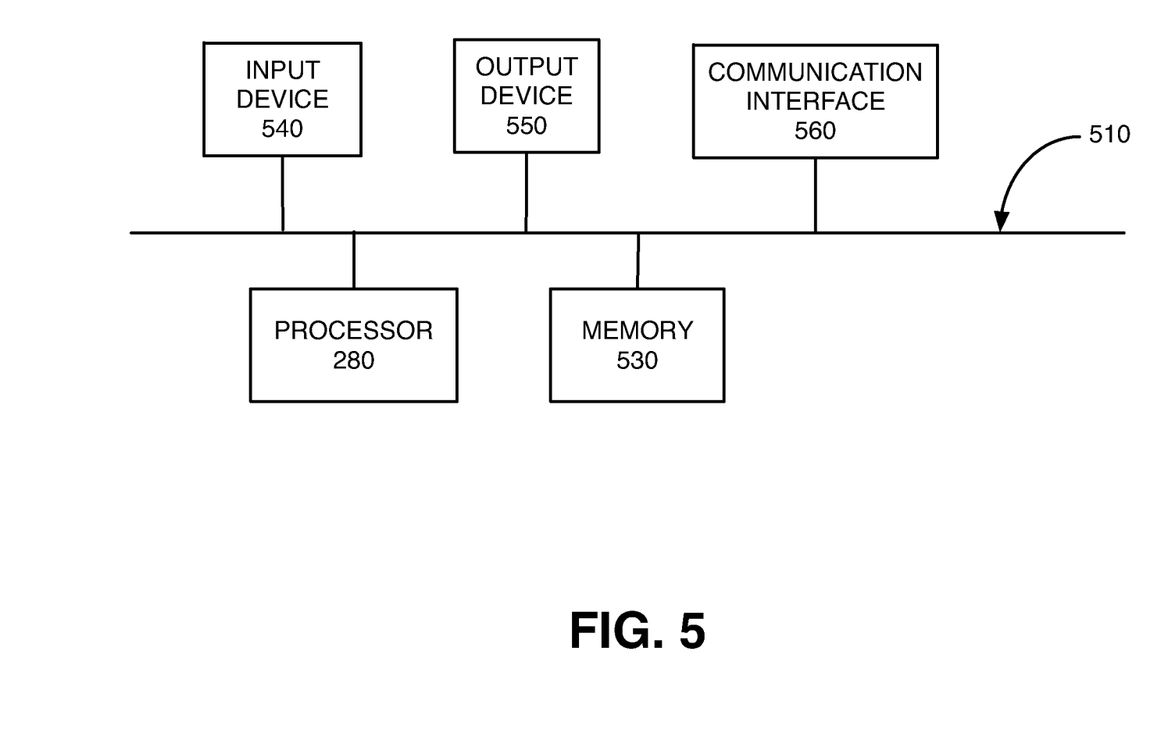
FIG. 5 is a block diagram of exemplary components of a platform in the mobile device of FIGS. 2A and 2B.

FIG. 5 is a diagram of exemplary components in the platform 260. The phone platform 260 may include a bus 510, the processor 280, a memory 530, an input device 540, an output device 550, and a communication interface 560. The bus 510 may permit communication among the components of the mobile device 120. One skilled in the art would recognize that the mobile device 120 may be configured in a number of other ways and may include other or different elements. For example, the mobile device 120 may include one or more modulators, demodulators, encoders, decoders, etc., for processing data.

The processor 280 may include a processor, a microprocessor, an application specific integrated circuit (ASIC), a field programmable gate array (FPGA) or other processing logic. The processor 280 may execute software instructions/programs or data structures to control operation of the mobile device 120.

The memory 530 may include a random access memory (RAM) or another type of dynamic storage device that stores information and instructions for execution by the processor 280; a read only memory (ROM) or another type of static storage device that stores static information and instructions for use by the processor 280; a flash memory (e.g., an electrically erasable programmable read only memory (EEPROM)) device for storing information and instructions; a hard disk drive (HDD); and/or some other type of magnetic or optical recording medium and its corresponding drive. The memory 530 may also be used to store temporary variables or other intermediate information during execution of instructions by the processor 280. Instructions used by the processor 280 may also, or alternatively, be stored in another type of computer-readable medium accessible by the processor 280. A computer-readable medium may include one or more memory devices.

The input device 540 may include mechanisms that permit an operator to input information to the mobile device 120, such as a microphone in the mobile device 120, the microphone element 115 of the hands-free accessory 110, a keypad, control buttons, a keyboard (e.g., a QWERTY keyboard, a Dvorak keyboard, etc.), a gesture-based device, an optical character recognition (OCR) based device, a joystick, a touch-based device, a virtual keyboard, a speech-to-text engine, a mouse, a pen, a stylus, voice recognition and/or biometric mechanisms, etc. In an exemplary implementation, display may be a touch screen display that acts as an input device.

The output device 550 may include one or more mechanisms that output information to the user 100, including a display, such as display, a printer, one or more speakers. As described above, in an exemplary implementation, the display may be a touch screen display. In such an implementation, the display may function as both an input device and an output device.

The communication interface 560 may include a transceiver that enables the mobile device 120 to communicate with other devices and/or systems. For example, the communication interface 560 may include a modem or an Ethernet interface to a LAN. The communication interface 560 may also include mechanisms for communicating via a network, such as a wireless network. For example, the communication interface 560 may include one or more radio frequency (RF) transmitters, receivers and/or transceivers and one or more antennas for transmitting and receiving RF data via a network.

The mobile device 120 may control turning on/off or closing/opening of the third switch 310 or the first switch 400 in response to the processor 280 executing sequences of instructions contained in a computer-readable medium, such as the memory 530. Such instructions may be read into the memory 530 from another computer-readable medium via, for example, the communication interface 560. In alternative embodiments, hard-wired circuitry may be used in place of or in combination with software instructions to implement processes consistent with the invention. Thus, implementations described herein are not limited to any specific combination of hardware circuitry and software.

Figure 6:
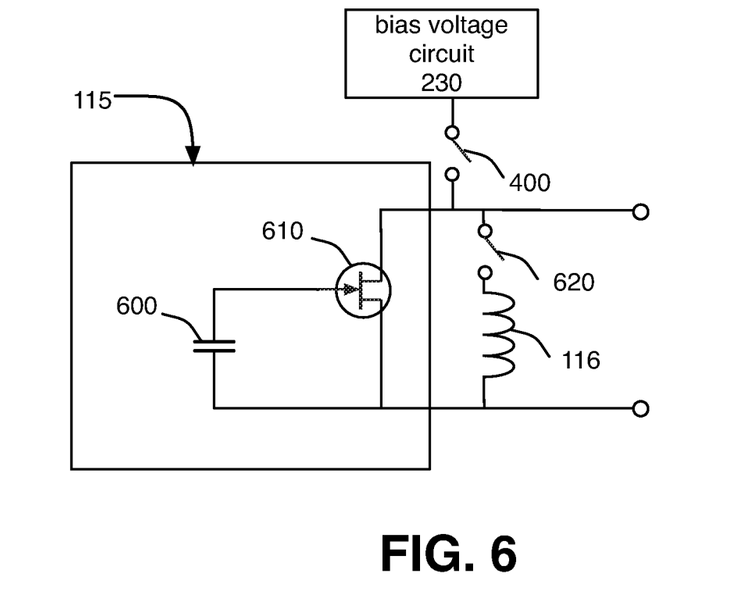
FIG. 6 is a schematic diagram of an exemplary circuit in the hands-free accessory of FIG. 2B.

FIG. 6 is a schematic diagram of an exemplary circuit in the hands-free accessory 110 of FIG. 2B. The microphone element 115 may include a capacitor element 600 and a Field Effect Transistor (FET) 610. A first end of the capacitor element 600 may be coupled with a source terminal of the FET 610. A second end of the capacitor element 400 may be coupled with a gate terminal of the FET 610. -The hands-free accessory 110 may further include a second switch 620 coupled with the telecoil 116 in series. A first end of the second switch 620 may be coupled with the second end of the telecoil 116. A second end of the second switch 620 may be coupled with a drain terminal of FET 610. The second end of the second switch 620 may be coupled with the output terminal 211 of the hands-free accessory 110. The first end of the telecoil 116 may be configured to couple with the ground. The hands-free accessory 110 may include a first switch 400 located between the bias voltage circuit 230 and the microphone element 115. Turning on/off or closing/opening the first switch 400 may control supply of the bias voltage to the microphone element 115. The microphone element 115 may be operated when the first switch 400 is turned on or closed, as the bias voltage is supplied to the microphone element 115. The microphone element 115 may not be operated when the first switch 400 is turned off or opened, as the bias voltage is not supplied to the microphone element 115. When the first switch 400 is turned on or closed, the second switch 620 may be turned off or opened. When the first switch 400 is turned off or opened, the second switch 620 may be turned on or closed. In other words, the first switch 400 and the second switch 620 may be configured to automatically operate such that when one of the first switch 400 and the second switch 620 is closed, the other of the first switch 400 and the second switch 620 will be turned off or opened.

Figure 7:
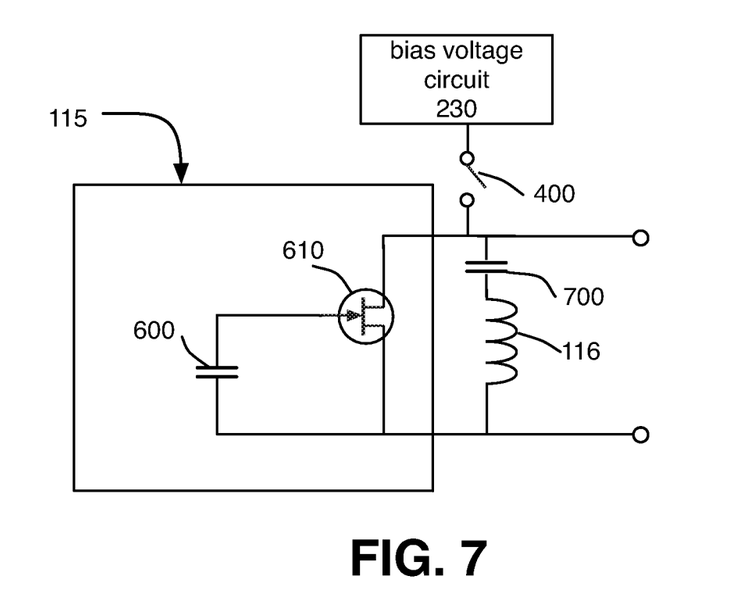
FIG. 7 is a schematic diagram of another exemplary circuit in the hands-free accessory of FIG. 2B.

FIG. 7 is a schematic diagram of another exemplary circuit in the hands-free accessory 110 of FIG. 2B. The microphone element 115 may include the capacitor element 600 and the FET 610. The hands-free accessory 110 may further include a capacitor 700 coupled with the telecoil 116 in series. A first end of the capacitor 700 may be coupled with the second end of the telecoil 116. A second end of the capacitor 700 may be coupled with the drain terminal. The second end of the capacitor 700 may be coupled with the output terminal 211 of the hands-free accessory 110. The first end of the telecoil 116 may be configured to couple with the ground. The capacitor 700 may reduce a Direct Current (DC) element from a signal detected by the telecoil 116. The hands-free accessory 110 may include a first switch 400 located between the bias voltage circuit 230 and the microphone element 115. Turning on/off or closing/opening the first switch 400 may control supply of the bias voltage to the microphone element 115. The microphone element 115 may be operated when the first switch 400 is turned on or closed, as the bias voltage is supplied to the microphone element 115. The microphone element 115 may not be operated when the first switch 400 is turned off or opened, as the bias voltage is not supplied to the microphone element 115.

The same or similar configurations of the microphone elements 115, the telecoil 116, and the capacitor 700 as illustrated in FIGS. 6 and 7 may be implemented for the configurations illustrated in FIG. 2A.

The hands-free accessory 110 may further include a housing. The microphone element 115 and the telecoil 116 may be located in the housing.

The hands-free accessory 116 may further include a shield configured to reduce electric interference between the telecoil 116 and the microphone element 115. The shield may be arranged between the microphone element 115 and the telecoil 116.

The bias voltage provided by the bias voltage circuit 230 may be set to operate the FET 610 in the microphone element 115. When the third switch 310 or the first switch 400 is turned off or opened, the bias voltage may not be supplied to the FET 610. Accordingly, the microphone element 115 may not operate, since the FET 610 may be off.

Referring to FIGS. 2A and 2B, when the microphone element 115 does not operate, a telecoil signal voltage between the first end and the second end of the telecoil 116 may be input/transmitted to the input terminal 221 of the mobile device 120 via the output terminal 221 of the hands-free accessory 110. The first operational amplifier 240 may amplify the telecoil signal voltage input/transmitted to the mobile device 112. The A/D converter 245 may convert the amplified telecoil signal voltage to a digital signal. The digital signal may be processed by the processor 280. The D/A converter 255 may convert the processed digital signal to an analog signal. The second operational amplifier 250 may amplify the analog signal from the D/A converter 255. The amplified analog signal may be input/transmitted to the input terminal 212 of the hands-free accessory 110 via the output terminal 222 of the mobile device 120. The amplified analog signal may be converted to sounds at the ear speaker 117.

EXAMPLARY IMPLEMENTATION

Referring back to FIG. 1, the user 100 may carry the hands-free accessory 110 associated with the mobile device 120. Assume that the user 100 is located in a place where the wire loop 130 coupled with the audio system 105 is installed. The audio system 105 may provide to the wire loop 130 an alternating electric current 140 corresponding to sounds. Magnetic field 150 may be generated when the electric current 140 flows through the wire loop 130. When the magnetic field 150 is altered according to a change in the electric current 140, the magnetic field in the telecoil 116 may be altered, and an electric current may be induced in the telecoil 116. Referring back to FIGS. 3A and 3B, the user 100 may turn off or open the third switch 310 in the mobile device 120. Alternatively, referring back to FIGS. 4A and 4B, the user 100 may turn off or open the first switch 400 in the hands-free accessory 110. Referring back to FIGS. 2A and 2B, a voltage generated by the induced electric current in the telecoil 116 may be input or transmitted to the mobile device 120, and amplified by the operational amplifier 240 in the mobile device 120. The amplified voltage may be converted to a digital signal by the A/D converter 245, and processed by the processor 280. The processed digital signal may be converted to an analog signal by the D/A converter 255, and amplified by the operational amplifier 250. The amplified analog signal may be input or transmitted to the hand-free accessory 110. The input or transmitted signal may be further modulated at the hands-free accessory 110. The ear speaker 117 may convert the signals input or transmitted from the mobile device 120 or the modulated signal to sounds. The user 100 may hear the sounds converted at the ear speaker 117 of the hands-free accessory 110, while the sound may not include amplified ambient sound and/or environmental noises. Referring back to FIGS. 3A and 3B, when the user 100 wants to use telecommunication services, the user 100 may turn on or close the third switch 310 in the mobile device 120. Alternatively, when the mobile device 120 receives telecommunication signals, the third switch 310 may turn on or close automatically. Alternatively, referring back to FIGS. 4A and 4B, when the user 100 wants to use telecommunication services, the user 100 may turn off or open the first switch 400 in the hands-free accessory 110. Alternatively, when the mobile device 120 receives telecommunication signals, the first switch 400 may be turn on or close automatically. When the third switch 310 or 400 is turned on or closed, the telecoil 116 may be electrically coupled with the wire loop 130 to effectively amplify sounds that will be provided to the user 100.

CONCLUSION

The foregoing description of the embodiments described herein provides illustration and description, but is not intended to be exhaustive or to limit the implementations to the precise form disclosed. Modifications and variations are possible in light of the above teachings or may be acquired from the practice of the teachings.

It will also be apparent to one of ordinary skill in the art that aspects of the invention, as described above, may be implemented in computer devices, cellular communication devices/systems, media playing devices, methods, and/or computer program products. Accordingly, aspects described herein may be embodied in hardware and/or in software (including firmware, resident software, micro-code, etc.). Furthermore, aspects described herein may take the form of a computer program product on a computer-usable or computer-readable storage medium having computer-usable or computer-readable program code embodied in the medium for use by or in connection with an instruction execution system. The actual software code or specialized control hardware is not limited to implement aspects consistent with the described. Thus, the operation and behavior of the aspects were described without reference to the specific software code—it being understood that one of ordinary skill in the art would be able to design software and control hardware to implement the aspects based on the description herein.

The terms "comprises/comprising" "include/including" as used herein specifies the presence of stated features, integers, steps, or components, but does not preclude the presence or addition of one or more other features, integers, steps, components, or groups thereof.

No element, act, or instruction used in the description of the present application should be construed as critical or essential to the embodiments described unless explicitly described as such. Also, as used herein, the article "a" or "an" is intended to include one or more items.

As used herein, the term "coupled" should be construed as the joining of two members directly, indirectly, electrically, or wirelessly to one another. Such joining may be stationary in nature or movable in nature and/or such joining may allow for the flow of electricity, electrical signals, radio frequency signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the terms "include," "for example," "such as," and the like are used illustratively and are not intended to limit the embodiments.

What is claimed is:

1. A hands-free accessory for a mobile device, comprising:
   a microphone element; and
   a telecoil coupled with the microphone element in parallel;
   wherein the microphone element and the telecoil are coupled with an output terminal of the hands-free accessory, and
   wherein an induced electric current is generated in the telecoil by a magnetic field generated by an electric current flowing in a wire loop outside the hands-free accessory.

2. The hands-free accessory of claim 1, wherein the output terminal of the hands-free accessory is configured to electrically or wirelessly couple with an input terminal of the mobile device.

3. The hands-free accessory of claim 1, further comprising:
   an ear speaker coupled with an input terminal of the hands-free accessory.

4. The hands-free accessory of claim 3, wherein the input terminal of the hands-free accessory is configured to electrically or wirelessly couple with an output terminal of the mobile device.

5. The hands-free accessory of claim 1, further comprising:
   a first switch coupled between the microphone element and the telecoil.

6. The hands-free accessory of claim 5, wherein the first switch is automatically turned on or closed when a telecommunication signal is input or transmitted to the hands-free accessory from the mobile device.

7. The hands-free accessory of claim 1, wherein the microphone element comprises:
   a capacitor element, and
   a Field Effect Transistor (FET), wherein
   a first end of the capacitor element is coupled with a source terminal of the FET,
   a second end of the capacitor element is coupled with a gate terminal of the FET,
   a first end of the telecoil is coupled with the source terminal, and a second end of the telecoil is coupled with a drain terminal of the FET.

8. The hands-free accessory of claim 1, further comprising:
a capacitor coupled with the telecoil in series, or
a second switch coupled with the telecoil in series, wherein
a first end of the capacitor or a first end of the second switch is coupled with a second end of the telecoil, and
a second end of the capacitor or a second end of the second switch is coupled with the output terminal of the hands-free accessory.

9. The hands-free accessory of claim 8, wherein the microphone element comprises:
a capacitor element, and
a FET, wherein
a first end of the capacitor element is coupled with a source terminal of the FET,
a second end of the capacitor element is coupled with a gate terminal of the FET,
a first end of the telecoil is coupled with the source terminal, and
the second end of the capacitor or the second end of the second switch is coupled with a drain terminal of the FET.

10. The hands-free accessory of claim 1, further comprising:
a housing,
wherein the microphone element and the telecoil are in the housing.

11. The hands-free accessory of claim 1, further comprising:
a shield configured to reduce electric interference between the telecoil and the microphone element.

12. A hands-free accessory, comprising:
a microphone element; and
a telecoil coupled with the microphone element in parallel;
wherein the microphone element and the telecoil are coupled with an output terminal of the hands-free accessory, and
wherein inductance of the telecoil is set according to a predetermined signal-to noise ratio of the telecoil.

13. A mobile device, comprising:
an input terminal configured to couple with an output terminal of a hands-free accessory including a microphone element and a telecoil coupled with the microphone element in parallel;
a bias voltage circuit configured to supply a bias voltage to the microphone element, the bias voltage circuit coupled with the input terminal of the mobile device; and
a processor configured to process a signal input or transmitted to the mobile device from the input terminal of the mobile device.

14. The mobile device of claim 13, wherein the microphone element comprises a Field Effect Transistor (FET), and the bias voltage is set to operate the FET in the microphone element.

15. The mobile device of claim 13, further comprising:
a resistor between the bias voltage circuit and the input terminal of the mobile device.

16. The mobile device of claim 13, further comprising:
a first operational amplifier having a first inverting terminal and a first non-inverting terminal; and
an analog/digital (A/D) converter,
wherein the first inverting terminal is coupled with a ground, and the first non-inverting terminal is coupled with the input terminal of the mobile device, and
wherein an input port of the A/D converter is coupled with a first output terminal of the first operational amplifier, and an output port of the A/D converter is coupled with an input port of the processor.

17. The mobile device of claim 13, wherein the processor is further configured to control turning on/off or closing/opening of a first switch between the microphone element and the telecoil.

18. The mobile device of claim 13, further comprising:
a third switch between the bias voltage circuit and a point coupling the bias voltage circuit and the input terminal of the mobile device.

19. The mobile device of claim 18, wherein the processor is further configured to control turning on/off or closing/opening of the third switch.

20. The mobile device of claim 13, further comprising:
a digital/analog (D/A) converter; and
a second operational amplifier having a second inverting terminal, a second non-inverting terminal, and a second output terminal,
wherein an input port of the D/A converter is coupled with an output port of the processor, and wherein the second inverting terminal is coupled with a ground, the second non-inverting terminal is coupled with an output port of the D/A converter, and the second output terminal is coupled with an output terminal of the mobile device.

* * * * *